(12) United States Patent
Miller et al.

(10) Patent No.: US 11,853,948 B2
(45) Date of Patent: Dec. 26, 2023

(54) METHODS AND SYSTEMS FOR MANAGING RISK WITH RESPECT TO POTENTIAL CUSTOMERS

(71) Applicant: INTERNATIONAL BUSINESS MACHINES CORPORATION, Armonk, NY (US)

(72) Inventors: Grant D. Miller, Arvada, CO (US); Kelley Anders, East New Market, MD (US); Jeremy R. Fox, Georgetown, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 408 days.

(21) Appl. No.: 15/945,939

(22) Filed: Apr. 5, 2018

(65) Prior Publication Data

US 2019/0311310 A1  Oct. 10, 2019

(51) Int. Cl.
  *G06Q 10/0635* (2023.01)
  *G06Q 50/00* (2012.01)

(52) U.S. Cl.
  CPC ......... *G06Q 10/0635* (2013.01); *G06Q 50/01* (2013.01)

(58) Field of Classification Search
  None
  See application file for complete search history.

(56) References Cited

U.S. PATENT DOCUMENTS

| | | | |
|---|---|---|---|
| 7,689,624 B2 | 3/2010 | Huang et al. | |
| 8,571,951 B2* | 10/2013 | Diana | G06Q 30/08 705/37 |
| 8,831,972 B2* | 9/2014 | Angell | G06Q 30/02 705/14.26 |
| 9,105,042 B2 | 8/2015 | Sylves | |
| 9,189,797 B2 | 11/2015 | Ghosh et al. | |
| 9,384,493 B2 | 7/2016 | Harris et al. | |
| 9,438,619 B1* | 9/2016 | Chan | H04L 63/105 |
| 9,536,329 B2 | 1/2017 | Saxena et al. | |
| 9,665,885 B1* | 5/2017 | Allouche | G06Q 30/0244 |
| 9,710,449 B2 | 7/2017 | Soni et al. | |
| 9,721,296 B1* | 8/2017 | Chrapko | G06Q 40/08 |
| 9,852,477 B2* | 12/2017 | Palmer | G06F 16/285 |
| 10,410,142 B1* | 9/2019 | Hess | G06Q 10/00 |

(Continued)

FOREIGN PATENT DOCUMENTS

WO   WO-2016126464 A1 *  8/2016   ........... G06Q 10/105

OTHER PUBLICATIONS

Nikulin, Vladimir. "On the method for data streams aggregation to predict shoppers loyalty." 2015 International Joint Conference on Neural Networks (IJCNN). IEEE, 2015. (Year: 2015).*

(Continued)

*Primary Examiner* — Sara Grace Brown
(74) *Attorney, Agent, or Firm* — Griffiths & Seaton PLLC

(57) ABSTRACT

Embodiments for managing potential customers by one or more processors are described. An identification of a potential customer for a vendor is received. A risk level associated with the potential customer is determined based on customer data from at least one data source associated with the potential customer. A signal representative of the determined risk level associated with the potential customer is generated.

15 Claims, 5 Drawing Sheets

(56) References Cited

U.S. PATENT DOCUMENTS

| | | | |
|---|---|---|---|
| 10,692,141 B2* | 6/2020 | McKenna | G06Q 40/03 |
| 10,867,303 B1* | 12/2020 | Manapat | G06Q 10/067 |
| 10,891,628 B1* | 1/2021 | Flowers | H04W 4/029 |
| 2002/0143562 A1* | 10/2002 | Lawrence | G06Q 40/08 |
| | | | 705/311 |
| 2005/0131752 A1* | 6/2005 | Gracie | G06Q 30/0203 |
| | | | 705/7.28 |
| 2008/0071578 A1* | 3/2008 | Herz | G16H 10/60 |
| | | | 705/311 |
| 2009/0089107 A1* | 4/2009 | Angell | G08B 13/1961 |
| | | | 705/318 |
| 2012/0066084 A1* | 3/2012 | Sneyders | G06Q 30/0601 |
| | | | 705/26.1 |
| 2012/0209786 A1* | 8/2012 | Shah | G06Q 30/02 |
| | | | 705/319 |
| 2012/0253886 A1* | 10/2012 | Nelson | G06Q 10/06 |
| | | | 705/7.31 |
| 2012/0271691 A1* | 10/2012 | Hammad | G06Q 30/02 |
| | | | 705/14.17 |
| 2013/0005331 A1* | 1/2013 | Turgeman | H04W 4/029 |
| | | | 455/426.1 |
| 2013/0080212 A1 | 3/2013 | Li et al. | |
| 2013/0124257 A1 | 5/2013 | Schubert | |
| 2014/0012772 A1* | 1/2014 | Pretorius | G06Q 10/08 |
| | | | 705/330 |
| 2015/0142495 A1* | 5/2015 | Garakani | G06Q 10/1095 |
| | | | 705/7.19 |
| 2015/0363490 A1* | 12/2015 | Hinchin | G06Q 10/10 |
| | | | 707/749 |
| 2016/0026939 A1* | 1/2016 | Schiffer | G06F 40/166 |
| | | | 705/7.11 |
| 2016/0042371 A1 | 2/2016 | Klemm | |
| 2016/0117466 A1* | 4/2016 | Singh | G06Q 50/265 |
| | | | 702/19 |
| 2016/0253688 A1* | 9/2016 | Nielsen | G06F 16/337 |
| | | | 705/7.31 |
| 2016/0267377 A1 | 9/2016 | Pan et al. | |
| 2016/0307201 A1* | 10/2016 | Turgeman | G06F 21/31 |
| 2016/0307249 A1* | 10/2016 | Ku | G06Q 30/0613 |
| 2017/0068976 A1 | 3/2017 | Wawrzynowicz | |
| 2017/0169431 A1* | 6/2017 | Groarke | G06Q 20/4016 |
| 2017/0221072 A1* | 8/2017 | AthuluruTlrumala | H04W 8/18 |
| 2017/0235830 A1 | 8/2017 | Smith et al. | |
| 2017/0250931 A1* | 8/2017 | Ioannou | H04L 67/18 |
| 2017/0372389 A1* | 12/2017 | Busch | G06Q 10/06395 |
| 2018/0165723 A1* | 6/2018 | Wright | G06Q 10/0635 |
| 2018/0191905 A1* | 7/2018 | McCoy | H04M 3/5175 |
| 2018/0276710 A1* | 9/2018 | Tietzen | G06Q 30/0269 |
| 2018/0308026 A1* | 10/2018 | Sinha | G06Q 10/0635 |
| 2019/0026786 A1* | 1/2019 | Khoury | G06Q 30/0271 |
| 2019/0102559 A1* | 4/2019 | Sherman | G06F 21/577 |

OTHER PUBLICATIONS

Hollerit et al., "Towards Linking Buyers and Sellers: Detecting Commercial Intent on Twitter," International World Wide Web Conference Committee (IW3C2), May 13-17, 2013 (4 pages).

Mahmud, "Leveraging cognitive computing and social media data to generate deep constituent insights," IBM Watson Innovations, 2015 (41 pages).

Li et al., "Identifying and Profiling Key Sellers in Cyber Carding Community: AZSecure Text Mining System," Journal of Management Information Systems, vol. 33, No. 4, Oct. 1, 2016 (29 pages).

Wang et al., "A hybrid model of sentimental entity recognition on mobile social media," EURASIP Journal of Wireless Communications and Networking, Oct. 24, 2016 (12 pages).

* cited by examiner

METHODS AND SYSTEMS FOR MANAGING RISK WITH RESPECT TO POTENTIAL CUSTOMERS

BACKGROUND OF THE INVENTION

Field of the Invention

The present invention relates in general to computing systems, and more particularly, to various embodiments for managing risk with respect to potential customers.

Description of the Related Art

In many modern transactions, vendors (e.g., sellers) of various types of goods and services often have very little, if any, direct (e.g., in person) contact with customers (e.g., buyers) before the transaction occurs. For example, countless vendors sell goods to sellers through various types of websites without communicating with the seller in any manner, and some transactions (e.g., property rentals) are performed in such a way that although some communication between the parties may take place, the vendor typically has very little interaction with the customer and rarely meets the customer in person.

As such, vendors typically do not have a way to easily and/or proactively identify customers, who may be difficult to please and/or may take some action after the transaction is completed, which may lead to various types of difficulties for the vendor (e.g., monetary, legal, etc.).

SUMMARY OF THE INVENTION

Various embodiments for managing potential customers by one or more processors are described. In one embodiment, by way of example only, a method for managing potential customers, again by one or more processors, is provided. An identification of a potential customer for a vendor is received. A risk level associated with the potential customer is determined based on customer data from at least one data source associated with the potential customer. A signal representative of the determined risk level associated with the potential customer is generated.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
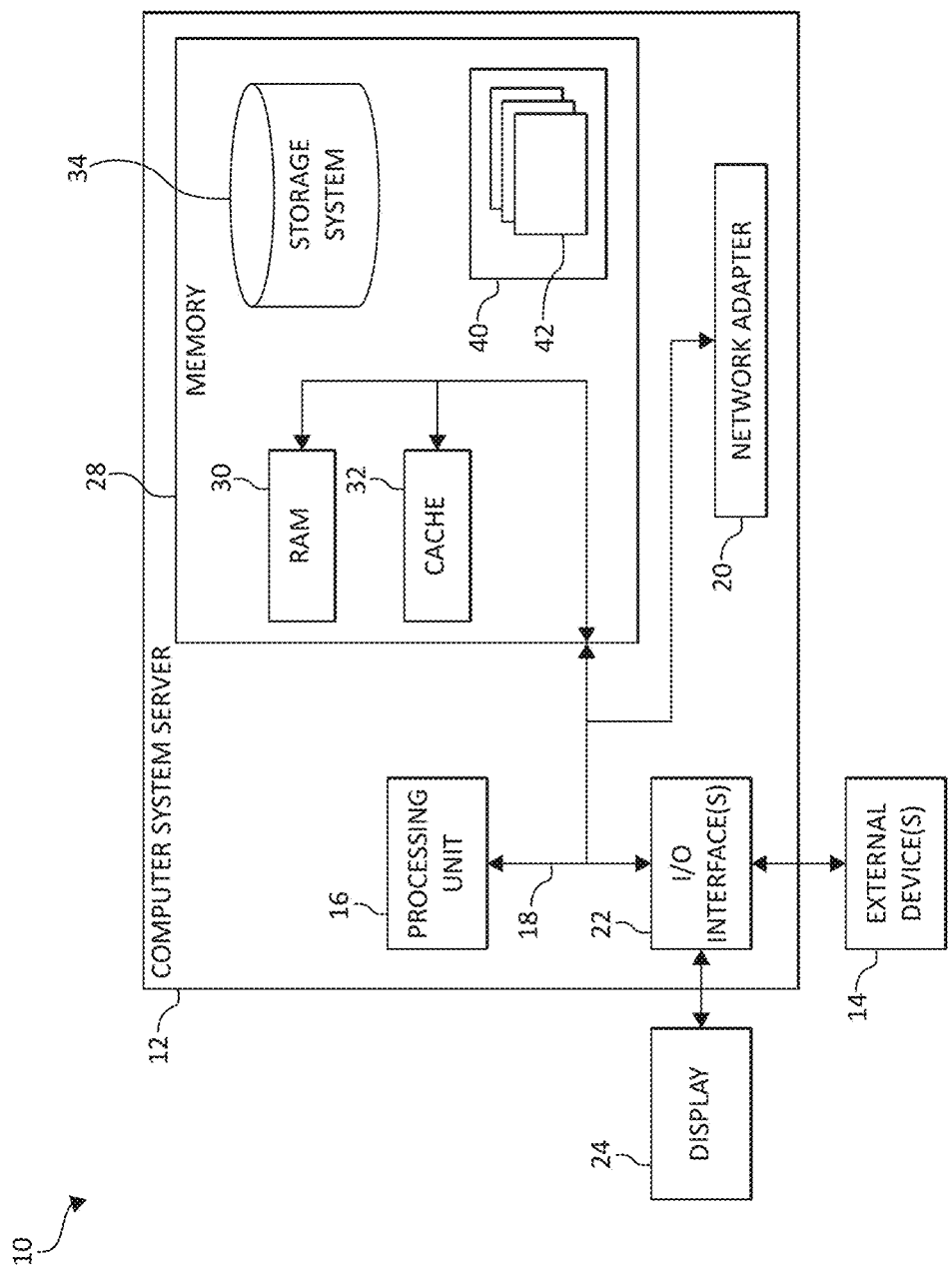
FIG. 1 is a block diagram depicting an exemplary computing node according to an embodiment of the present invention.

As discussed above, in many modern transactions, vendors (e.g., sellers) of various types of goods and services often have very little, if any, direct (e.g., in person) contact with customers (e.g., buyers) before the transaction occurs. As such, vendors typically do not have a way to easily and/or proactively identify customers who may be difficult to please and/or may take some action after the transaction is completed which may lead to various types of difficulties for the vendor (e.g., monetary, legal, etc.).

For example, countless vendors sell goods to sellers through various types of websites without communicating with the seller in any manner and some transactions (e.g., property rentals) are performed in such a way that although some communication between the parties may take place, the vendor typically has very little interaction with the customer and rarely meets the customer in person. As such, it is often difficult for the vendor to gauge the type of person (or entity) he/she is dealing with and how likely they are to be pleased with the transaction.

To address these needs, some embodiments described herein provide methods and systems for assisting vendors in managing potential customers and/or in determining the risk of dealing with potential customers.

Embodiments described herein may collect data for a cognitive sentiment analysis on, for example, a social media system, aggregate all data found via sentiment analysis, and identify key trigger points to produce outcomes and communicate specific findings through a user interface based on the cognitive sentiment analysis. The systems/methods may also dynamically analyze trending data through cognitive sentiment analysis over large periods of past time (e.g., days, weeks, months, years, etc.). In at least some embodiments, the usual buyer-purchasing mindset is reversed to be one from the seller's perspective, as the degree of risk involved in engaging with a prospective buyer/client may be determined based on, at least in part, the seller's profile/preferences and past engagements with other clients. The systems/methods described herein may also be used to generate leads for sellers or vendors (e.g., to assist in identifying/locating potential customers).

According to some embodiments described herein, a cognitive analysis is utilized on various types of data sources associated with the potential customer(s). In particular, in some embodiments, a "sentiment analysis" is performed on at least some of the available and/or accessible data sources associated with the potential customer. Examples of data sources include, but are not limited to, social media profiles/activity, electronic communications (e.g., email, text messages, voicemail, phone calls, etc.), and reviews/feedback available on various platforms (e.g., e-commerce websites), as well as perhaps any other sources that include information about the potential seller, such as other websites (e.g., containing news stories). In some embodiments, a risk level associated with a potential customer, or more particularly, the risk level of dealing with (e.g., completing a transaction with) a potential customer, is determined by scanning (and/or searching) the available data sources for keywords, key phrases, questions, etc. (e.g., scanning for "negative language," complaints left by or for the potential customer, the number of questions asked, etc.). Based on the available data, the potential customer (and/or the risk level of the potential customer) may be determined (e.g., calculated, scored, graded, etc.), and an indication thereof (e.g., visual, such as a chart or graph) may be provided to the user (e.g., the vendor) to help them determine whether or not they should engage (e.g., deal with) the potential customer and/or determine the optimal manner for engaging with the potential customer.

In some embodiments, the determining of the risk level associated with the potential seller may (also) be based on data associated with the vendor. For example, the vendor may create a user profile and provide indications with respect to various preferences (e.g., regarding customers), and in some embodiments, other data sources (e.g., similar to those used with respect to the potential customer) may be scanned for data/information associated with previous transactions of the vendor and/or the previous customers of the vendor. With this information, the system may be able to identify which previous transactions of the vendor were relatively problematic (and those that were not) and correlate those transactions to the behavior presented by the previous customers. Using such, the system may virtually create a model or "ideal" customer for the vendor. In such embodiments, the determining of the risk level for the potential customer and/or the generated indication thereof may be based on and/or relative to the ideal customer. In other words, the system may provide an indication of how similar/dissimilar the determined risk level of the potential customer is compared to that of previous customers.

In some embodiments, the vendor may be able to provide feedback to the system regarding, for example, the effectiveness of the indicated risk level of a customer (e.g., before and/or after a transaction is completed with the customer). For example, if the vendor completes a transaction with a customer that was indicated as being relatively low risk, and the transaction with the customer is problematic, the vendor may alert the system of such so that the risk assessment process may be adjusted in subsequent cycles. Further, the methods and systems described herein may utilize feedback left by other vendors to tune and/or make changes to the risk assessment process.

As such, in some embodiments, the methods and/or systems described herein may utilize "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, users' feedback, with respect to, for example, the indicated risk level regarding potential customers, etc. as described herein. Utilizing the models, the performance (or operation) of the system (e.g., utilizing/based on new inputs) may be predicted and/or the performance of the system may be optimized by investigating how changes in the input(s) effect the output(s).

In particular, in some embodiments, a method, by one or more processors, for managing potential customers is provided. An identification of a potential customer for a vendor is received. A risk level associated with the potential customer is determined based on customer data from at least one data source associated with the potential customer. A signal representative of the determined risk level associated with the potential customer is generated.

The at least one data source associated with the potential customer may include at least one of social media activity, electronic communications, or a combination thereof. The determining of the risk level associated with the potential customer may include automatically scanning the customer data for at least one of keywords, key phrases, or a combination thereof.

The determining of the risk level associated with the potential customer may further be based on vendor data from at least one data source associated with the vendor. The at least one data source associated with the vendor may include at least one of social media activity, electronic communications, or a combination thereof associated with previous transactions of the vendor. The determining of the risk level associated with the potential customer may include automatically scanning the vendor data for at least one of keywords, key phrases, or a combination thereof.

The determining of the risk level associated with the potential customer may further be based on a comparison of the customer data and the vendor data. The generating of the signal representative of the determined risk level associated with the potential customer may include causing a chart indicative of the determined risk level associated with the potential customer to be rendered on a display device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
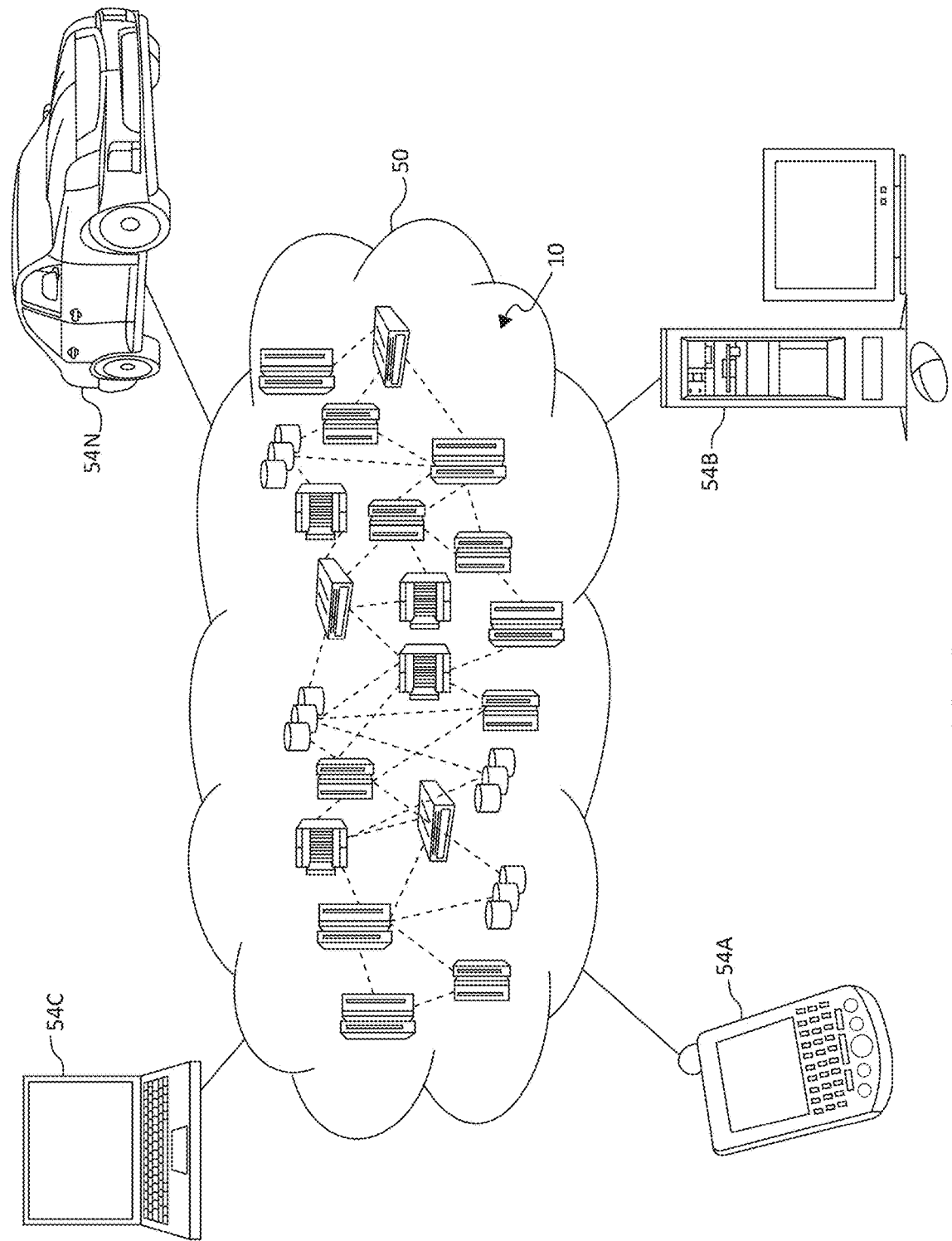
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
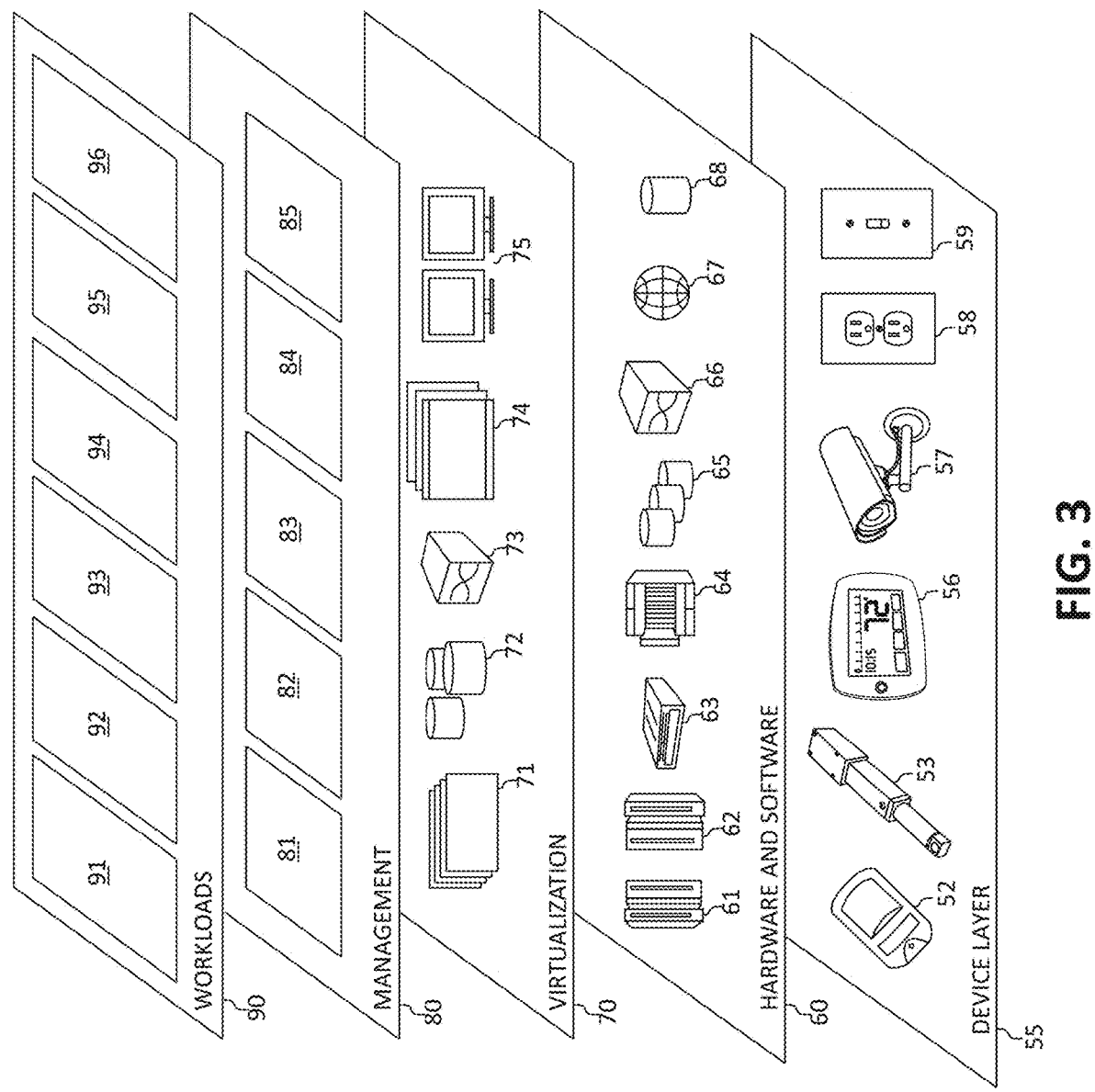
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for managing potential customers as described herein. One of ordinary skill in the art will appreciate that the workloads and functions 96 for managing potential customers may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As described above, some embodiments described herein provide methods and systems for assisting vendors in managing potential customers and/or determining the risk of dealing with potential customers. In some embodiments, this is accomplished utilizing a cognitive analysis or process of various types of data sources associated with the potential customer(s). In particular, in some embodiments, a "sentiment analysis" is performed on at least some of the available and/or accessible data sources associated with the potential customer. Examples of data sources include, but are not limited to, social media profiles/activity, electronic communications (e.g., email, text messages, voicemail, phone calls, etc.), and reviews/feedback available on various platforms (e.g., e-commerce websites). In some embodiments, a risk level associated with a potential customer, or more particularly, the risk level of dealing with (e.g., completing a transaction with) a potential customer, is determined by scanning (and/or searching) the available data sources for keywords, key phrases, questions, etc. (e.g., scanning for "negative language," complaints left by or for the potential customer, the number of questions asked, etc.). Based on the available data, the potential customer (and/or the risk level of the potential customer) may be determined (e.g., calculated, scored, graded, etc.) and an indication thereof (e.g., visual, such as a chart or graph) may be provided to the user (e.g., the vendor) to help them determine whether or not they should engage with the potential customer and/or determine the optimal manner for engaging with the potential customer.

In some embodiments, a user (e.g., an individual or group of users) utilizes the methods and systems described herein using, for example, a software application (e.g., mobile application) or a website via a computing device, such as a mobile electronic device, desktop PC, etc. It should be noted that in some embodiments not all of the steps or processes described herein may be utilized and/or may be performed in an order different from those specifically described.

In some embodiments, the user is a vendor. As used herein, "vendor" may refer to any individual or group of individuals (e.g., a business) that is (or will be) offering a product and/or service for sale, rent, etc. For example, the vendor may be selling any type of goods (e.g., a seller of clothing, food, automobiles, furniture, etc.), selling real estate, attempting to rent out a property (e.g., a vacation rental), offering his/her services to potential clients, etc. The vendor may be utilizing any appropriate platform to conduct and/or promote their goods, services, business, including online/e-commerce platforms, print media, etc.

The vendor may first create a "user account," as is commonly understood. For example, the vendor may provide basic information, such as their name, contact information, current address, etc., as well as the purpose and/or application for the user account (e.g., the type of goods and/or services being sold). This profile may be stored by the system. The various types of data sources (e.g., with respect to potential customers and/or the vendor) that are to be utilized by the system may also be defined (e.g., via user input and/or cognitive analysis of all accessible data sources). Examples of data sources include, but are not limited to, social media profiles/activity, electronic communications (e.g., email, text messages, voicemail, phone calls, etc.), and reviews/feedback available on various platforms (e.g., e-commerce websites), as well as perhaps any other sources that include information about the potential seller, such as other websites (e.g., containing news stories). The correct outlets within particular data sources (e.g., social media posts, comments, "groups," etc.) that are to be queried (or scanned) may also be determined automatically and/or set by user preferences. It should be noted that over time cognitive learning (e.g., based in part on user feedback) may assist in identifying the proper scope/location of particular types of data (e.g., social media activity) to be collected and used in determining the risk level for potential customers.

In some embodiments, a potential customer for the vendor is then identified (or an identification thereof is received). As used herein, a "potential customer" may refer to any individual or groups of individuals that may engage (or at least potentially engage) in a transaction with the vendor (e.g., a buyer, a client, etc.). The potential customer may be identified through any appropriate means, such as the potential customer contacting, or at least attempting to contact, the vendor. For example, the potential customer may send the vendor an email or text message, call the vendor, contact the vendor through the vendor's website or some other website (e.g., an e-commerce website), etc. However, in some embodiments, the vendor may actively search for potential customers (e.g., using the systems and methods described herein) and/or the system may recommend potential customers (e.g., before and/or after performing the risk assessment). Further, in some embodiments, the potential customer may create a user account similar to that of the vendor (e.g., both the vendor and the potential customer(s) may be registered within the system).

After the potential customer(s) is identified, data is collected (e.g., with respect to the potential customer and/or the vendor) that was determined to be within the scope and/or appropriate for the risk assessment. In some embodiments, the available, pertinent data is aggregated and verified to ensure the data points are valid. The data is then stored for use in the subsequent steps.

In some embodiments, a sentiment analysis is then performed on the collected data (e.g., with respect to the potential customer and/or the vendor) considered to be within the appropriate scope. The sentiment analysis may be performed utilizing sentiment analysis software, as is commonly understood in the art. The sentiment analysis may scan the collected data for various types of content, such as keywords and key phrases (e.g., "negative" language), questions (e.g., the type and/or number asked), complaints left by or for the potential customer (and/or those associated with the vendor), etc. As such, in some embodiments, the system may go beyond reviews, ratings, feedback, etc. left for/by the potential customer, and search/scan other types of data (e.g., emails, social media activity, etc.) for language, context, etc. that may help categorize or rate the potential customer (e.g., at least with respect to a risk level).

The resulting sentiment analysis may then be used to determine or calculate a risk level associated with the potential customer and/or a risk level associated with dealing with the potential customer. The determining of the risk level may include determining multiple components or aspects of the risk associated with dealing with the potential client. In some embodiments, the determined risk level includes an "exposure" component and a "consequence" component. The exposure component may refer to the likelihood that the potential customer will not be pleased with the transaction (e.g., how demanding the potential client is) and the consequence component may refer to what sort(s) of actions the potential client will take in the event he/she is not pleased (e.g., take legal action, attempt to steal or defraud the vendor, give a low rating/leave poor feedback for the vendor, etc.). In some embodiments, particular types of data (i.e., triggering data/events) associated with the potential customer may be noted and specifically marked/identified for the vendor. For example, if the collected data suggests that the potential customer has taken legal action against another vendor (or perhaps done so more than a predetermined number of times, perhaps within a specified time frame), such information may be highlighted or specified when the determined risk level is provided to the vendor. In some embodiments, the risk level (and/or individual components thereof) is calculated as a numerical score (e.g., on any appropriate scale). However, in some embodiments, the risk level is provided to the vendor (or other user) in a graphical or visual form, as described below.

As mentioned above, in some embodiments, the risk level is (also) based on information associated with the vendor. For example, the data collected about the potential customer may be compared to any pertinent data associated with the vendor (e.g., preferences or other data from the vendor's user account, data collected from other various data sources associated with the vendor, etc.). In some embodiments, data associated with the vendor, such as data associated with previous transactions of the vendor (e.g., with other customers), is used to generate a virtual "ideal" customer for the vendor. That is, data associated with previous transactions of the vendor and/or the vendor's preferences may be used to create a profile for the type of customer with which the vendor should look to do business (e.g., a customer that is likely to be pleased with the transaction and/or not take any serious action against the vendor if he/she is not pleased). In such embodiments, the determining of the risk level of the potential customer may take this ideal customer into account (e.g., the risk level may be determined or graded relative to that of the ideal customer). However, it should be noted that in some embodiments, the risk level may be determined in a manner such that it is not based on data associated with the vendor and/or may be determined based on a comparison of multiple potential clients (e.g., in the event that multiple potential clients contact the vendor).

After the risk level associated with the potential customer(s) is determined, a signal representative thereof is generated. In some embodiments, the determined risk level (and/or individual components thereof) is provided to the vendor via, for example, an electronic communication (e.g., an email, text message, etc.) and/or by displaying the result on a display device (e.g., on a computing device). In some embodiments, the risk level is provided to the vendor in the form of a chart, graph, or other visual presentation. The determined risk level for the potential customer(s) may then be used by the vendor in determining whether or not to pursue doing business with the potential customer and/or which potential customer may be the best option. In some embodiments, a recommendation is made to the vendor (e.g., whether or not the vendor should engage/deal with the potential customer), based on, for example, the determined risk level for the potential customer and/or the difference between the risk level for the potential customer and the risk level for the ideal customer (as described above) for the vendor. In some embodiments, data collected with respect to each potential customer and/or the risk level determined for each potential customer is saved (and may be used for cognitive learning, etc.).

In some embodiments, the vendor may be able to provide feedback to the system regarding, for example, the effectiveness of the indicated risk level of a customer (e.g., before and/or after a transaction is completed with the customer). For example, if the vendor completes a transaction with a customer that was indicated as being relatively low risk, and the transaction with the customer is problematic, the vendor may alert the system of such so that the risk assessment process may be adjusted in subsequent cycles. Further, the methods and systems described herein may utilize feedback left by other vendors to tune and/or make changes to the risk assessment process.

Figure 4:
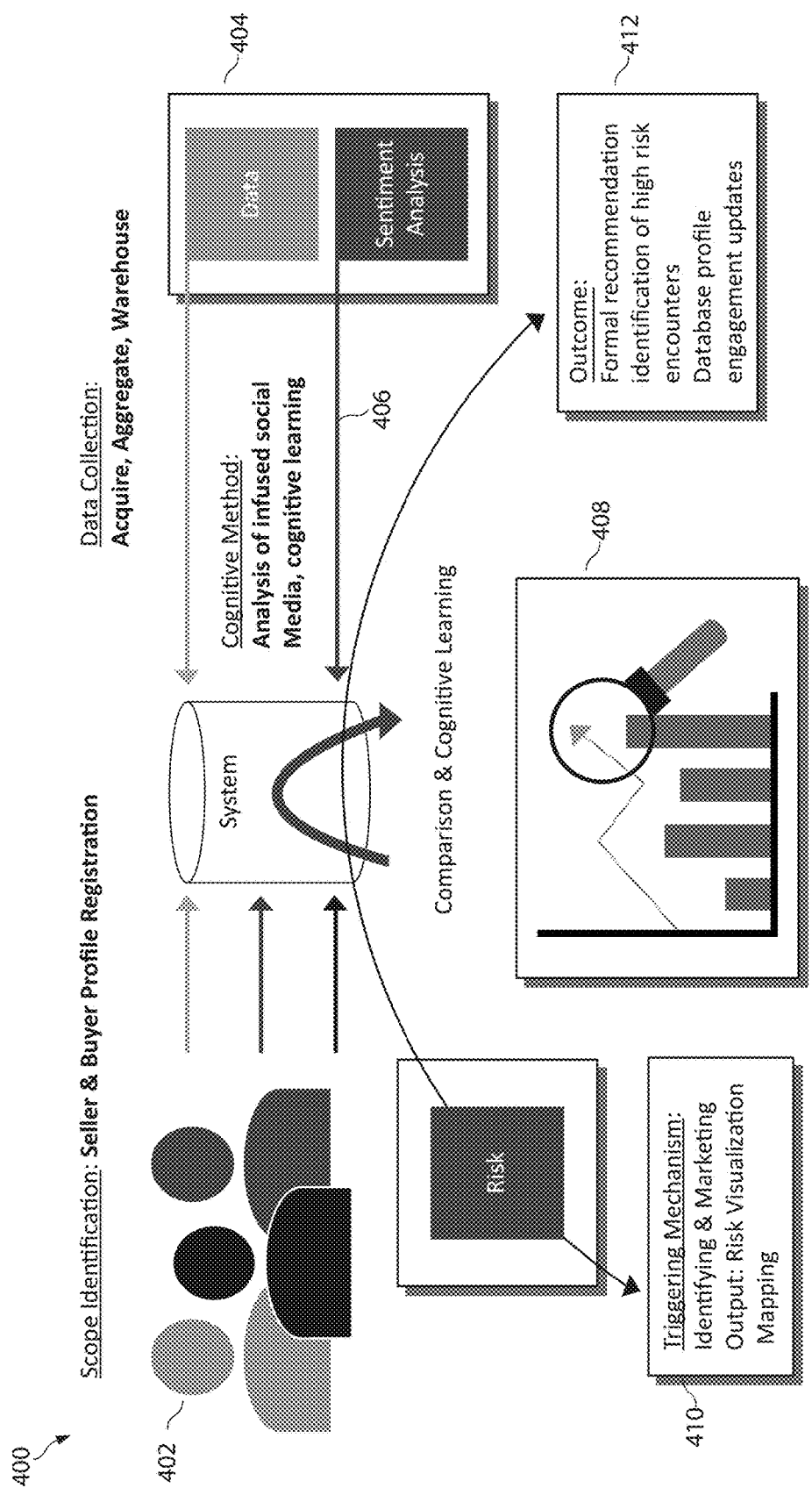
FIG. 4 is a flowchart/block diagram of a system for managing potential customers according to an embodiment of the present invention.

FIG. 4 illustrates a flowchart/block diagram of a system (and/or method) 400 for managing potential customers, or more particularly, determining a risk level associated with dealing with potential customers, according to some embodiments described herein. First, at step 402, in the depicted embodiment, both a vendor (e.g., a seller) and a potential customer (e.g., a buyer) register with the system and/or create user profiles, as described above.

Next, at step 404, the appropriate data (e.g., associated with the buyer and/or the seller) is acquired, aggregated, and warehoused (or stored), as described above. At step 406, a cognitive method is initiated in which the available data (e.g., social media activity, etc.) is analyzed using, for example, cognitive learning and/or a sentiment analysis. At step 408, the appropriate data from the buyer is compared to that of the seller and/or other buyers and, in some embodiments, a cognitive learning process (e.g., based on previous feedback) is used to determine the risk level of the buyer. A chart or graph may be generated (e.g., on a display device) to visualize the risk level for the seller, as described above.

At step 410, in the depicted embodiment, a triggering mechanism is utilized if particular types of data are detected (e.g., the trigger data/events described above). The data is marked and identified and may be incorporated in the chart or graph generated as the visualization of the risk level of the buyer. At step 412, a formal recommendation regarding engaging with the buyer is provided, triggering events are identified (e.g., perhaps in conjunction with the chart or graph), and any data is stored for future cycles.

Figure 5:
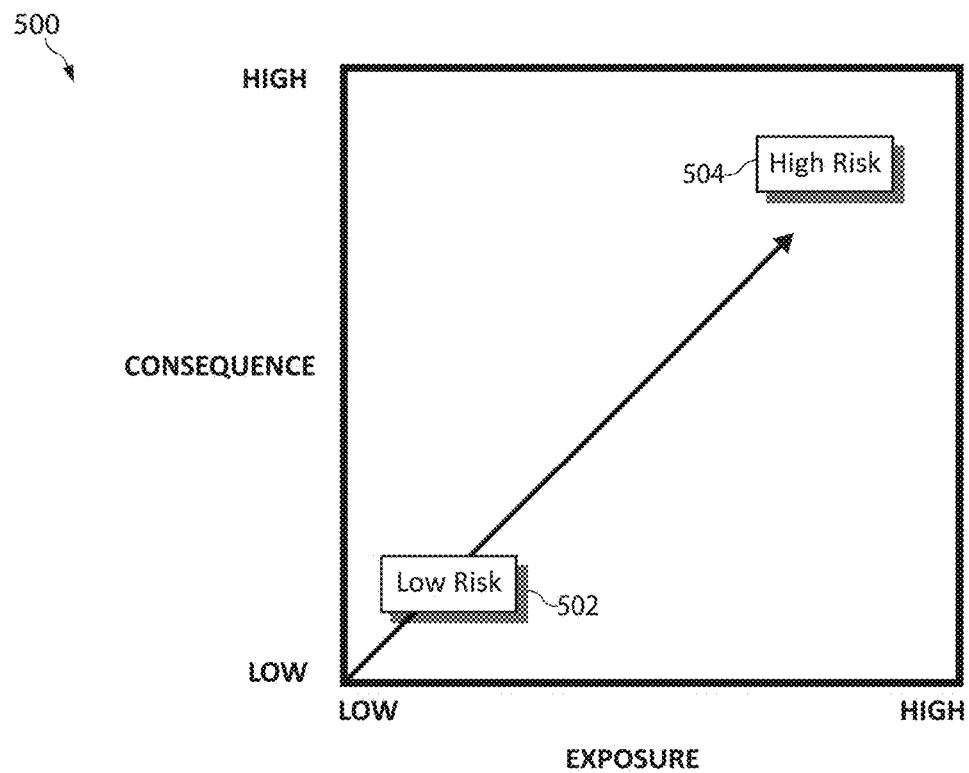
FIG. 5 is an exemplary graph that may be used to visualize a risk level associated with a potential customer according to some embodiments.

FIG. 5 illustrates an exemplary graph 500 that may be used to visual the determined risk level associated with a potential customer according to some embodiments. As shown, the risk level may include an exposure component and a consequence component, as described above, indicated along the horizontal axis (i.e., the x-axis) and the vertical axis (i.e., the y-axis), respectively. The low risk region 502 on the graph 500 may correspond to the risk level associated with a relatively low risk customer, such as an ideal customer for the vendor, as described above. The high risk region 504 may correspond to the risk level associated with a relatively high risk customer. The determined risk level for a potential customer may be visualized as a region on the graph (e.g., the high risk region 504) and/or the difference (or the distance on the graph 500) between that particular region and another region on the graph (e.g., the low risk region 502). In some embodiments, the graph 500 is shown in varying colors (e.g., a color grading), so that the higher risk regions are shown in a color different than that of the lower risk regions (e.g., red vs. green).

It should be noted that potential customers may be determined to have a risk level that includes more of one component (e.g., exposure or consequence) than the other. Such potential customers may be considered to have a "moderate" risk level. For example, if the determined risk level indicates that a potential customer has a relatively high exposure level and a relatively low consequence level, the system may still recommend engaging with that potential client because although the data associated with the potential customer indicates that he/she is relatively demanding (or "picky"), it is unlikely that they will take any serious action against the vendor if they are not pleased with the transaction, particularly if the vendor performs low intensity intervention to pacify the customer (which may be recommended by the system). Similarly, a relatively high consequence level with a relatively low exposure level may indicate that although the potential customer is likely to take serious action if they are not pleased, the data suggests that such an event is relatively unlikely. As such, a recommendation may be made to monitor the transaction closely if the vendor chooses to engage with the potential customer.

Figure 6:
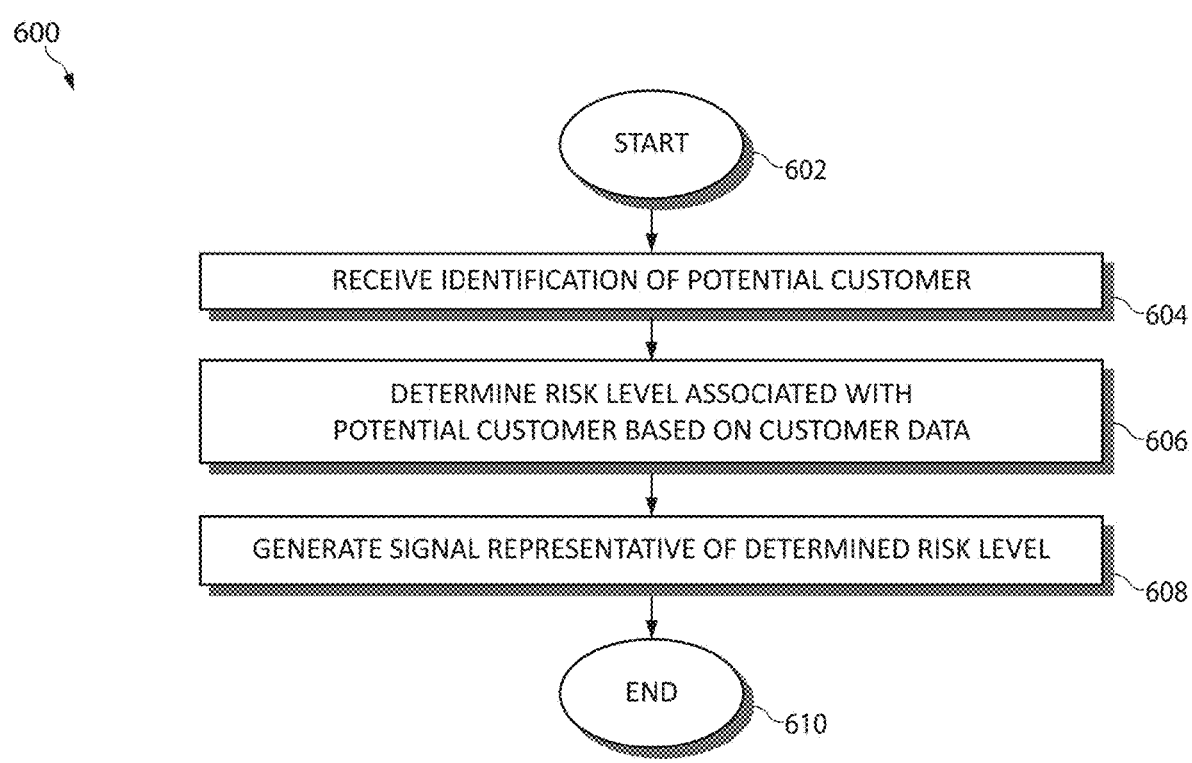
FIG. 6 is a flowchart diagram of an exemplary method for managing potential customers according to an embodiment of the present invention.

Turning to FIG. 6, a flowchart diagram of an exemplary method 600 for managing potential customers, or more particularly, determining a risk level associated with dealing with potential customers, according to some embodiments described herein, is provided. Method 600 begins (step 602) with, for example, a vendor, and perhaps a potential customer for the vendor, creating a user profile, as described above.

An identification of a potential customer for a vendor is received (or a potential customer is identified) (step 604). The potential customer may be identified through any appropriate means, such as the potential customer contacting, or at least attempting to contact, the vendor via, for example, an electronic communication (e.g., email, text message, calling the vendor) or contacting the vendor through the vendor's website or some other website (e.g., an e-commerce website). However, in some embodiments, the vendor may actively search for potential customers.

A risk level associated with the potential customer is determined based on customer data from at least one data source associated with the potential customer (step 606). The at least one data source associated with the potential customer may include at least one of social media activity, electronic communications, or a combination thereof. In some embodiments, the data sources are scanned for keywords and/or key phrases. The risk level may further be based on vendor data from at least one data source associated with the vendor (e.g., at least one of social media activity, electronic communications, or a combination thereof associated with previous transactions of the vendor), which may (also) be scanned for keywords and/or key phrases. The risk level may further be based on a comparison of the customer data and the vendor data.

A signal representative of the determined risk level associated with the potential customer is generated (step 608). The generating of the signal may include causing a chart indicative of the determined risk level associated with the potential customer to be rendered on a display device (e.g., on a computing device associated with the vendor).

Method 600 ends (step 610) with, for example, the vendor deciding whether or not to engage with the potential customer. In some embodiments, a recommendation is provided to the vendor. The vendor may provide feedback (e.g., related to the determined risk level, etc.), which may be utilized in subsequent cycles (e.g., performed for the same vendor and/or other vendors).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for managing potential customers comprising:

registering, through a user interface of an application executed by the one or more processors on an electronic device, by a vendor, a vendor profile having identifying information of the vendor and information associated with a type of business conducted by the vendor, wherein the vendor profile is inclusive of specific customer characteristics desirable by the vendor;

responsive to receiving the vendor profile, performing, by the one or more processors, a cognitive analysis on a plurality of data sources of varying platforms and channels to identify vendor data correspondent to the vendor, wherein performing the cognitive analysis includes automatically scanning the plurality of data sources to determine portions of particular data sources of the plurality of data sources having the vendor data within a scope of determining a risk level of a potential customer;

receiving, through user input in the user interface of the application and prior to any analyzing of the potential customer, a specific identification of the potential customer for the vendor;

responsive to receiving the specific identification of the potential customer for the vendor, automatically searching, by the one or more processors, for customer data representative of previous transactions between the potential customer and alternative vendors, as contained in the plurality of data sources, by using the cognitive analysis to crawl a network linking the plurality of data sources and parse the plurality of data sources for the customer data, wherein the plurality of data sources include e-commerce websites containing statements produced by the potential customer and alternative customers with respect to the alternative vendors, applicable social media profiles and activity of the potential customer, and electronic communications;

in conjunction with the automatic searching, identifying, by the one or more processors, the customer data as specifically negative statements produced by the potential customer and directed toward the alternative vendors as detected in the plurality of data sources, wherein, when parsing the plurality of data sources, the cognitive analysis automatically separates and retrieves a first subset of the portions of the plurality of data sources associated with the potential customer that contextually correlate within the scope of determining the risk level based on the type of business conducted by the vendor from a second subset of the portions of the plurality of data sources that do not contextually correlate within the scope of determining the risk level based on the negative statements, and wherein the identifying of the customer data further includes identifying specific triggering data comprising a detection of information in the plurality of data sources that the potential customer has taken legal action against the alternative vendors over a predetermined number of times within a specified time frame;

training, by the one or more processors at the first time, a machine learning model to identify the risk level of the potential customer according to both the vendor data from the plurality of data sources associated with the vendor and the customer data from at least one data source of the plurality of data sources associated with the potential customer, wherein training the machine learning model includes performing a sentiment analysis on the vendor data and the customer data, correlating information of the previous transactions in the vendor data to behavioral characteristics identified in the customer data according to the sentiment analysis, and predicting the risk level of the potential customer based on the correlation;

determining, by the one or more processors at the first time, the risk level associated with the potential customer according to the machine learning model, wherein the machine learning model outputs at least an exposure component and a consequence component constituent to the determined risk level, wherein the exposure component is representative of a likelihood of a negative sentiment of the potential customer toward a transaction between the vendor and the potential customer subsequent to the transaction being completed, wherein the consequence component is representative of negative actions, inclusive of a likelihood of taking the legal action, stealing, defrauding and providing poor feedback, the potential customer is predicted to take toward the vendor as a consequence of the negative sentiment based at least in part on the specific triggering data;

and causing, by the one or more processors at the first time, a graphical representation of the determined risk level associated with the potential customer to be displayed by the user interface of the application on a display of the electronic device, wherein the graphical representation includes highlighting the specific triggering data accompanying the determined risk level associated with the potential customer.

2. The method of claim 1, wherein the determining of the risk level associated with the potential customer includes automatically scanning the customer data for at least one of keywords, key phrases, or a combination thereof.

3. The method of claim 1, wherein the plurality of data sources associated with the vendor includes at least one of the social media activity, the electronic communications, or a combination thereof associated with the previous transactions of the vendor, and wherein the determining of the risk level associated with the potential customer includes automatically scanning the vendor data for at least one of keywords, key phrases, or a combination thereof.

4. The method of claim 1, wherein the determining of the risk level associated with the potential customer is further based on a comparison of the customer data and the vendor data.

5. The method of claim 1, wherein the causing of the graphical representation of the determined risk level associated with the potential customer includes causing a chart indicative of the determined risk level associated with the potential customer to be rendered on the display.

6. A system for managing potential customers comprising:
an electronic device having at least one processor configured to:

registers, through input received on a user interface of an application executed by the at least one processor on the electronic device, by a vendor, a vendor profile having identifying information of the vendor and information associated with a type of business conducted by the vendor, wherein the vendor profile is inclusive of specific customer characteristics desirable by the vendor;

responsive to receiving the vendor profile, performs, by the at least one processor, a cognitive analysis on a plurality of data sources of varying platforms and channels to identify vendor data correspondent to the vendor, wherein performing the cognitive analysis includes automatically scanning the plurality of data sources to determine portions of particular data sources of the plurality of data sources having the vendor data within a scope of determining a risk level of a potential customer;

receives, through user input in the user interface of the application and prior to any analyzing of the potential customer, a specific identification of the potential customer for the vendor;

responsive to receiving the specific identification of the potential customer for the vendor, automatically searches, by the at least one processor, for customer data representative of previous transactions between the potential customer and alternative vendors, as contained in the plurality of data sources, by using the cognitive analysis to crawl a network linking the plurality of data sources and parse the plurality of data sources for the customer data, wherein the plurality of data sources include e-commerce websites containing statements produced by the potential customer and alternative customers with respect to the alternative vendors, applicable social media profiles and activity of the potential customer, and electronic communications;

in conjunction with the automatic searching, identifies, by the at least one processor, the customer data as specifically negative statements produced by the potential customer and directed toward the alternative vendors as detected in the plurality of data sources, wherein, when parsing the plurality of data sources, the cognitive analysis automatically separates and retrieves a first subset of the portions of the plurality of data sources associated with the potential customer that contextually correlate within the scope of determining the risk level based on the type of business conducted by the vendor from a second subset of the portions of the plurality of data sources that do not contextually correlate within the scope of determining the risk level based on the negative statements, and wherein the identifying of the customer data further includes identifying specific triggering data comprising a detection of information in the plurality of data sources that the potential customer has taken legal action against the alternative vendors over a predetermined number of times within a specified time frame;

trains, by the at least one processor at the first time, a machine learning model to identify the risk level of the potential customer according to both the vendor data from the plurality of data sources associated with the vendor and the customer data from at least one data source of the plurality of data sources associated with the potential customer, wherein training the machine learning model includes performing a sentiment analysis on the vendor data and the customer data, correlating information of the previous transactions in the vendor data to behavioral characteristics identified in the customer data according to the sentiment analysis, and predicting the risk level of the potential customer based on the correlation;

determines, by the at least one processor at the first time, the risk level associated with the potential customer according to the machine learning model, wherein the machine learning model outputs at least an exposure component and a consequence component constituent to the determined risk level, wherein the exposure component is representative of a likelihood of a negative sentiment of the potential customer toward a transaction between the vendor and the potential customer subsequent to the transaction being completed, wherein the consequence component is representative of negative actions, inclusive of a likelihood of taking the legal action, stealing, defrauding and providing poor feedback, the potential customer is predicted to take toward the vendor as a consequence of the negative sentiment based at least in part on the specific triggering data;

and causes, by the at least one processor at the first time, a graphical representation of the determined risk level associated with the potential customer to be displayed by the user interface of the application on a display of the electronic device, wherein the graphical representation includes highlighting the specific triggering data accompanying the determined risk level associated with the potential customer.

7. The system of claim 6, wherein the determining of the risk level associated with the potential customer includes automatically scanning the customer data for at least one of keywords, key phrases, or a combination thereof.

8. The system of claim 6, wherein the plurality of data sources associated with the vendor includes at least one of the social media activity, the electronic communications, or a combination thereof associated with the previous transactions of the vendor, and wherein the determining of the risk level associated with the potential customer includes automatically scanning the vendor data for at least one of keywords, key phrases, or a combination thereof.

9. The system of claim 6, wherein the determining of the risk level associated with the potential customer is further based on a comparison of the customer data and the vendor data.

10. The system of claim 6, wherein the causing of the graphical representation of the determined risk level associated with the potential customer includes causing a chart indicative of the determined risk level associated with the potential customer to be rendered on the display.

11. A computer program product for managing potential customers by one or more processors, the computer program product comprising a non-transitory computer-readable storage medium having computer-readable program code portions stored therein, the computer-readable program code portions comprising:

an executable portion that registers, through input received on a user interface of an application executed by the one or more processors on an electronic device, by a vendor, a vendor profile having identifying information of the vendor and information associated with a type of business conducted by the vendor, wherein the vendor profile is inclusive of specific customer characteristics desirable by the vendor;

an executable portion that, responsive to receiving the vendor profile, performs, by the one or more processors, a cognitive analysis on a plurality of data sources of varying platforms and channels to identify vendor data correspondent to the vendor, wherein performing the cognitive analysis includes automatically scanning the plurality of data sources to determine portions of particular data sources of the plurality of data sources having the vendor data within a scope of determining a risk level of a potential customer;

an executable portion that receives, through user input in the user interface of the application and prior to any analyzing of the potential customer, a specific identification of the potential customer for the vendor;

an executable portion that, responsive to receiving the specific identification of the potential customer for the vendor, automatically searches, by the one or more processors, for customer data representative of previous transactions between the potential customer and alternative vendors, as contained in the plurality of data sources, by using the cognitive analysis to crawl a network linking the plurality of data sources and parse the plurality of data sources for the customer data, wherein the plurality of data sources include e-commerce websites containing statements produced by the potential customer and alternative customers with respect to the alternative vendors, applicable social media profiles and activity of the potential customer, and electronic communications;

an executable portion that, in conjunction with the automatic searching, identifies, by the one or more processors, the customer data as specifically negative statements produced by the potential customer and directed toward the alternative vendors as detected in the plurality of data sources, wherein, when parsing the plurality of data sources, the cognitive analysis automatically separates and retrieves a first subset of the portions of the plurality of data sources associated with the potential customer that contextually correlate within the scope of determining the risk level based on the type of business conducted by the vendor from a second subset of the portions of the plurality of data sources that do not contextually correlate within the scope of determining the risk level based on the negative statements, and wherein the identifying of the customer data further includes identifying specific triggering data comprising a detection of information in the plurality of data sources that the potential customer has taken legal action against the alternative vendors over a predetermined number of times within a specified time frame;

an executable portion that trains, by the one or more processors at the first time, a machine learning model to identify the risk level of the potential customer according to both the vendor data from the plurality of data sources associated with the vendor and the customer data from at least one data source of the plurality of data sources associated with the potential customer, wherein training the machine learning model includes performing a sentiment analysis on the vendor data and the customer data, correlating information of the previous transactions in the vendor data to behavioral characteristics identified in the customer data according to the sentiment analysis, and predicting the risk level of the potential customer based on the correlation;

an executable portion that determines, by the one or more processors at the first time, the risk level associated with the potential customer according to the machine learning model, wherein the machine learning model outputs at least an exposure component and a consequence component constituent to the determined risk level, wherein the exposure component is representative of a likelihood of a negative sentiment of the potential customer toward a transaction between the vendor and the potential customer subsequent to the transaction being completed, wherein the consequence component is representative of negative actions, inclusive of a likelihood of taking the legal action, stealing, defrauding and providing poor feedback, the potential customer is predicted to take toward the vendor as a consequence of the negative sentiment based at least in part on the specific triggering data;

and an executable portion that causes, by the one or more processors at the first time, a graphical representation of the determined risk level associated with the potential customer to be displayed by the user interface of the application on a display of the electronic device, wherein the graphical representation includes highlighting the specific triggering data accompanying the determined risk level associated with the potential customer.

12. The computer program product of claim 11, wherein the determining of the risk level associated with the potential customer includes automatically scanning the customer data for at least one of keywords, key phrases, or a combination thereof.

13. The computer program product of claim 11, wherein the plurality of data sources associated with the vendor includes at least one of the social media activity, the electronic communications, or a combination thereof associated with the previous transactions of the vendor, and wherein the determining of the risk level associated with the potential customer includes automatically scanning the vendor data for at least one of keywords, key phrases, or a combination thereof.

14. The computer program product of claim 11, wherein the determining of the risk level associated with the potential customer is further based on a comparison of the customer data and the vendor data.

15. The computer program product of claim 11, wherein the causing of the graphical representation of the determined risk level associated with the potential customer includes causing a chart indicative of the determined risk level associated with the potential customer to be rendered on the display.

* * * * *